(12) United States Patent
Harrow (10) Patent No.: US 7,155,762 B2
(45) Date of Patent: *Jan. 2, 2007

(54) BED BASE WITH CORNER CONNECTOR, CORNER CONNECTOR AND KIT

(76) Inventor: Lawrence M. Harrow, 5959 Corvette St., Commerce, CA (US) 90040

( * ) Notice: Subject to any disclaimer, the term of this patent is extended or adjusted under 35 U.S.C. 154(b) by 0 days.

This patent is subject to a terminal disclaimer.

(21) Appl. No.: 11/054,634

(22) Filed: Feb. 9, 2005

(65) Prior Publication Data

US 2005/0138729 A1    Jun. 30, 2005

Related U.S. Application Data

(63) Continuation of application No. 10/410,127, filed on Apr. 9, 2003, now Pat. No. 6,865,758.

(51) Int. Cl.
*A47C 19/00* (2006.01)
(52) U.S. Cl. .................................. 5/288; 5/201; 5/286
(58) Field of Classification Search ................ 5/200.1, 5/201, 203–206, 282.1, 286, 290, 291, 304, 5/305
See application file for complete search history.

(56) References Cited

U.S. PATENT DOCUMENTS

| 2,721,338 | A | * | 10/1955 | Resnick | 5/285 |
| 3,699,593 | A | * | 10/1972 | Oetiker | 5/111 |
| 4,196,484 | A | * | 4/1980 | Harris | 5/201 |
| 4,263,683 | A | * | 4/1981 | Knoke | 5/200.1 |
| 4,870,711 | A | * | 10/1989 | Felix | 5/200.1 |
| 5,012,538 | A | * | 5/1991 | Timm | 5/200.1 |
| 6,865,758 | B1 | * | 3/2005 | Harrow | 5/288 |

* cited by examiner

*Primary Examiner*—Michael Trettel
(74) *Attorney, Agent, or Firm*—John J. Connors; Connors & Assoc. Inc.

(57) ABSTRACT

A bed base includes four side members oriented to stand upright on their lower edges. The side members are connected to form a rectangular support structure by corner connectors. Each corner connector comprises a top plate, a bottom plate, and a post. The plates overlap the upper and lower edges of the adjacent side members forming an individual corner. The post extends between the top plate and the bottom plate, pulling these plates towards each other to press the top and bottom plates firmly against the edges of the adjacent side members forming the corner.

5 Claims, 6 Drawing Sheets

BED BASE WITH CORNER CONNECTOR, CORNER CONNECTOR AND KIT

RELATED PATENT APPLICATION & INCORPORATION BY REFERENCE

This application is a continuation application of U.S. Ser. No. 10/410,127, entitled "BED BASE WITH CORNER CONNECTOR, CORNER CONNECTOR & KIT," filed Apr. 9, 2003, now U.S. Pat. No. 6,865,758. This related application is incorporated herein by reference and made a part of this application. Moreover, the inventor incorporates herein by reference any and all U.S. patents, U.S. patent applications, and other documents, hard copy or electronic, cited or referred to in this application.

DEFINITIONS

The words "comprising," "having," and "including," and other forms thereof, are intended to be equivalent in meaning and be open ended in that an item or items following any one of these words is not meant to be an exhaustive listing of such item or items, or meant to be limited to only the listed item or items.

"Rectangular" includes a square.

BACKGROUND OF INVENTION

In U.S. provisional patent application Ser. No. 60/337,414, entitled "Easy To Assemble Bed Base, Two-Component Connector & Kit," filed Nov. 5, 2001, and the utility patent application based thereon, U.S. patent application Ser. No. 10/279,280, entitled "Easy To Assemble Bed Base, Two-Component Connector & Kit," filed Oct. 24, 2002, the inventor discloses a rectangular bed base formed from four side members with interlocking connectors manually connected together at ends that adjoin. (Herein both these provisional and utility patent applications are referred to as Patent Applications.) The side members each have opposed edges and opposed ends and the interlocking connectors are of the two-component type with one component at the end of one side member and the other component at the end of an adjacent side member.

Each side member is symmetrical about its individual longitudinal axis. The side members are of equal width and they are positioned to stand vertically upright on one edge. The side members may be made from sheet metal that may be bent into a substantially C-shape cross-sectional configuration to form longitudinal, planar support members along the opposed edges of each side member. These support members assist in orienting the side members vertically. The support members are on opposite sides of a central, longitudinal, planar portion of each side member. Preferably, each support member extends outward in the same direction from the planar portion and each support member has substantially the same width and length. One support member is along one of the planar portion edges at substantially a right angle to the planar portion and the other support member is along the other of the planar portion edges at substantially a right angle to the planar portion.

SUMMARY OF INVENTION

This invention has one or more features as discussed subsequently herein. After reading the following section entitled DETAILED DESCRIPTION OF SOME EMBODIMENTS OF THIS INVENTION," one will understand how the features of this invention provide its benefits. The benefits of this invention include, but are not limited to: an easy to assemble bed base, the use of a minimum number of parts to connect the side members of the bed base together, and the reduction of costs of manufacture.

Without limiting the scope of this invention as expressed by the claims that follow, some, but not necessarily all, of its features are:

One, the bed base includes four side members. Each side member has an upper edge, a lower edge, and opposed ends, and preferably is symmetrical about its longitudinal axis. The side members are oriented to stand upright on their lower edges and are connected together at their adjacent ends to form a rectangular support structure having corners formed by adjacent side members substantially at rights angles to each other. Typically, adjacent side members form a miter joint, and the edges of the assembled side members are substantially flush.

Two, each side member, which may be made from metallic sheet material and may have a substantially C-shape cross-sectional configuration, usually has substantially the same width, and each side member has a central, longitudinal, planar portion between the upper and lower edges thereof. A pair of longitudinal, planar support members may extend outward in the same direction, and each longitudinal support member may have substantially the same width and substantially the same length. One support member may be along the upper edge at substantially a right angle to the planar portion and the other support member may be along the lower edge at substantially a right angle to the planar portion. The support members may be formed by bending the metallic sheet material.

Three, the bed base includes a first pair of side members having first lengths that are equal to each other and a second pair of side members having second lengths that are equal to each other and longer than the first lengths of the first pair. Side members of equal lengths are opposed to each other. The first pair of the side members have a length of from about 26 to about 63 inches and a width of from about 5 to about 18 inches, and the second pair of the side members may have a length of about 71 inches and a width of from about 5 to about 18 inches. The opposed ends of each side member maybe at an angle of substantially 45°, so that, upon assembly of the side members into the rectangular support structure, the ends of adjacent side members form a miter joint.

Four, at each individual corner is a corner connector. Each corner connector may comprises a top plate, a bottom plate, and post element extending between the top plate and the bottom plate. The top plate may overlap the upper edges of the adjacent side members forming an individual corner, and the bottom plate may overlap the lower edges of the adjacent side members forming an individual corner. The post element is positioned within rectangular support structure.

Five, the post element may pull the plates towards each other to press the top plate and bottom plate firmly against the edges of the adjacent side members forming the corner to which the corner connector is attached. The post element may have a lower end, and a foot member may be attached to this lower end of the post element. The lower end of the post element may be threaded, and the foot member may be connected by a threaded coupling to the threaded lower end of the post element. Typically, the foot members are below the lower edges of the side members to elevate the bed base above a supporting surface. The foot members may have an inside end coupled to the lower end of the post element and an outside end having a enlarged, substantially smooth surface that rests upon the supporting surface.

Six, the post element may have an enlarged head end that bears against an exterior surface of the top plate. The post element typically couples the top plate and bottom plate together, drawing them towards each other so said plates each bear snugly against the edges of the adjacent side members forming an individual corner to which the corner connector is attached.

Seven, the top plate and bottom plate each may have therein a right angle channel. These plates, being respectively mounted on the upper edge and lower edge of adjacent side members forming an individual corner of the rectangular support structure, are positioned so that the channels of the top plate and bottom plate respectively receive therein the upper and lower edges of the side members. The top plate and bottom plate each may have an outer right angle wall. These outer right angle walls each have a first section extending along an exterior surface of one of the adjacent side members forming an individual corner and a second section extending along an exterior surface of the other of the adjacent side members forming an individual corner. Each plate may have therein a substantially planar ledge offset inwardly and spaced inwardly from the outer right angle wall. The ledge and outer right angle wall form the channel of each plate. The support members along the upper edges of the adjacent side members forming an individual corner fit snugly within the channel of the top plate and the support members along the lower edges of the adjacent side members forming this individual corner fit snugly within the channel of the bottom plate.

These features are not listed in any rank order nor is this list intended to be exhaustive.

This invention also includes a bed base kit including four side members and four the corner connectors of this invention.

DESCRIPTION OF DRAWING

Some embodiments of this invention, illustrating all its features, will now be discussed in detail. These embodiments depict the novel and non-obvious bed base, corner connector, and bed base kit of this invention as shown in the accompanying drawing, which is for illustrative purposes only. This drawing includes the following figures (Figs.), with like numerals indicating like parts.

DETAILED DESCRIPTION OF SOME EMBODIMENTS OF THIS INVENTION

Figure 1:
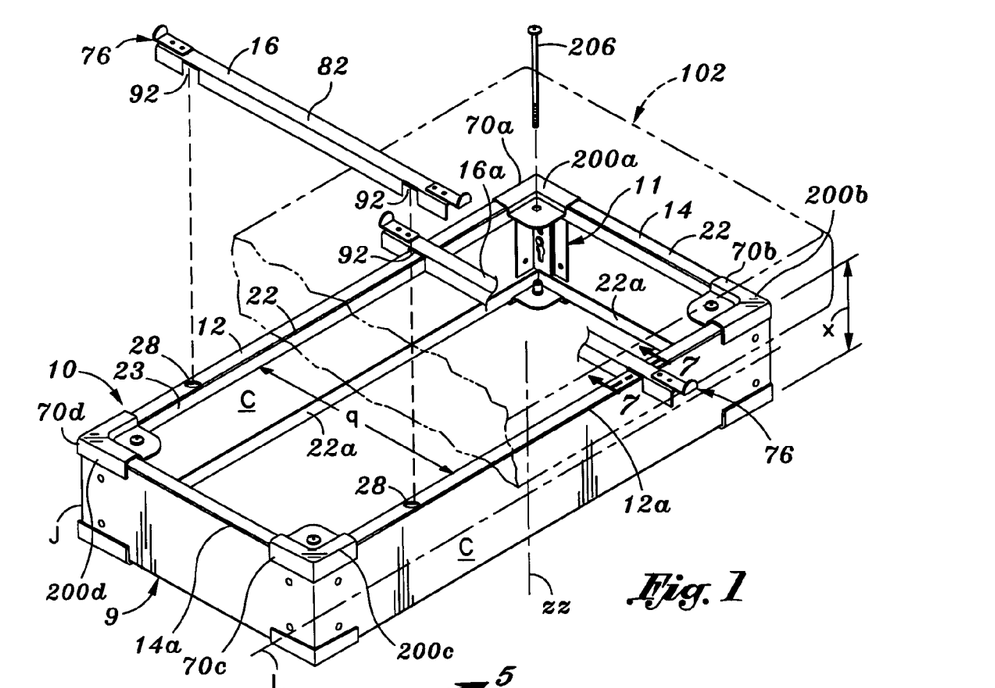
FIG. 1 is a partially exploded perspective view of one embodiment of the assembled bed base of this invention.
Figure 5:
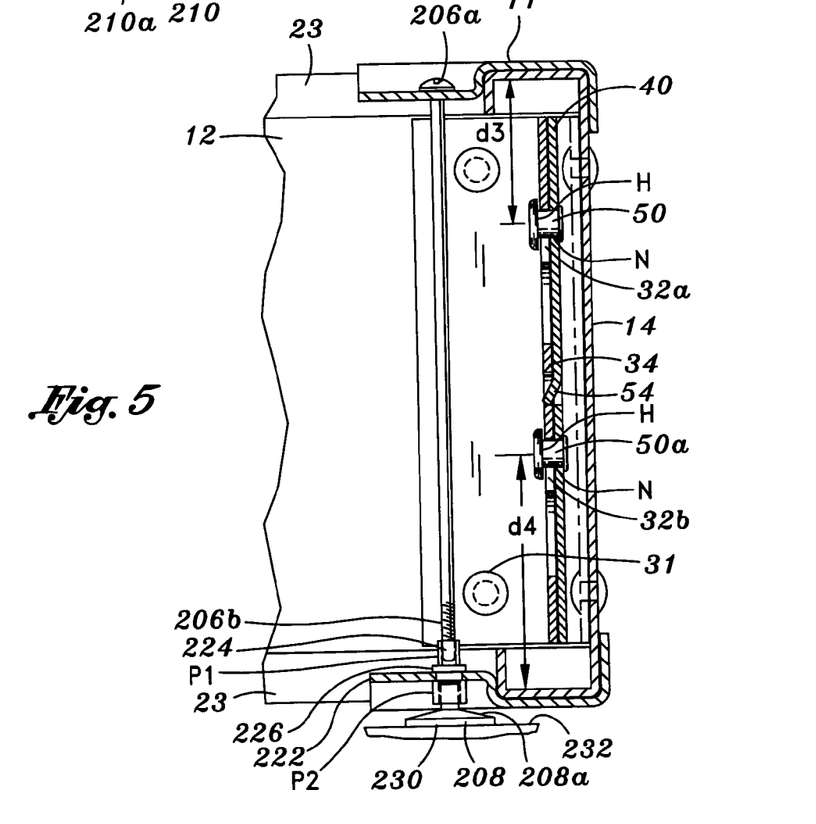
FIG. 5 is a cross-sectional view taken along line 5—5 of FIG. 3.
Figure 6:
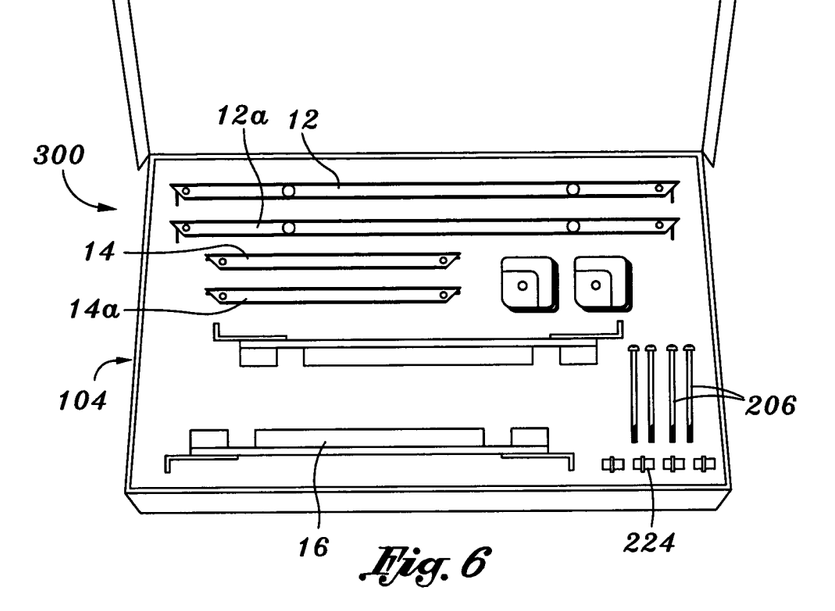
FIG. 6 is a perspective view showing the bed base kit of this invention including the disassembled bed base shown in FIG. 1.

One embodiment of his invention includes a bed base 10 illustrated in FIG. 1. This bed base 10 has a corner connector for each corner 70*a*, 70*b*, 70*c*, and 70*d* of the bed base, for example, the corner connector 200*a* illustrated in FIGS. 2 through 5. This invention also includes a bed base kit 300 such as illustrated in FIG. 6. For example, the bed base kit 300 includes all the necessary pieces to assemble the bed base 10 depicted in FIG. 1. The bed base 10 is sized to support a standard double box-spring 102 (shown in phantom lines). Kits for twin, queen, king and even custom size box-springs and mattresses are also within the scope of this invention. As discussed subsequently in greater detail, the number of pieces in the kits of this invention will vary depending on the size of the box-springs and mattresses being supported by the bed base.

The bed base 10 includes (a) four generally rectangular side members 12, 12*a*, 14, 14*a*, (b) a pair of box-spring/mattress support bars 16, 16*a* extending between, and at right angles to, the pair of opposed side members 12, 12*a*, and (c) four corner connectors 200*a*, 200*b*, 200*c*, and 200*d*. The members 12, 12*a*, 14, and 14*a* are first assembled into a rectangular structure 9 (FIG. 1) with adjoining, adjacent ends E3 and E4 (FIG. 2) of the side members 12, 12*a*, 14, and 14*a* positioned at right angles to each other to form the rectangular structure's corners 70*a* through 70*d*.

Figure 9:
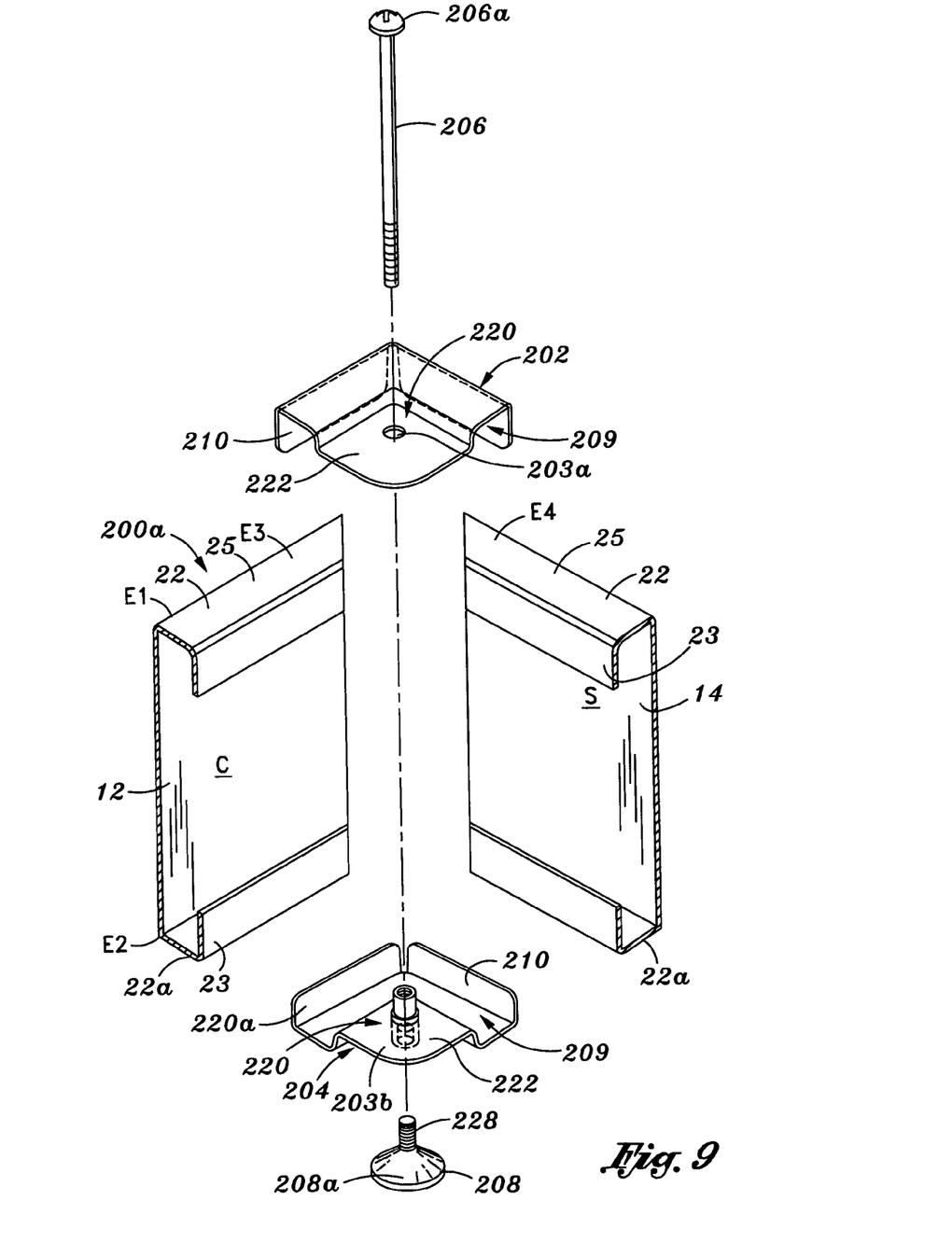
FIG. 9 is an exploded perspective view depicting another embodiment of the bed base corner connector of this invention eliminating the two-component connector used in the other embodiments shown in FIGS. 1 and 8.
Figure 10:
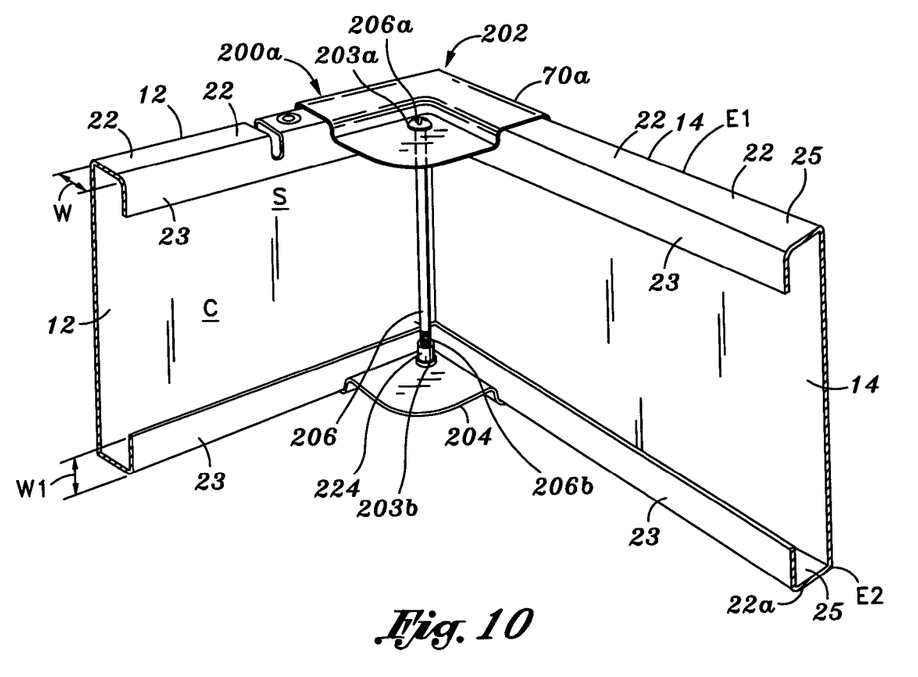
FIG. 10 is a perspective view of the corner connector shown in FIG. 9 assembled and holding the pair of adjacent side members forming the corner firmly in position at a right angle to each other without the use of two-component connector used in the other embodiments shown in FIGS. 1 and 8.

In the embodiment shown in FIG. 1, an optional two-component connector 11 securely connects the adjoining, adjacent ends E3 and E4 at each corner 70*a* through 70*d*. (See FIGS. 9 and 10 depicting embodiment without a two-component connector.) This two-component connector 11 is discussed in detail in the Patent Applications. Although the two-component connector 11 is suited for use with the bed base 10 of this invention, other types of two-component connectors may be used to attach the adjacent ends E3 and E4 at each corner 70*a* through 70*d*. Moreover, the use of any type of two-component may be avoided, since the four corner connectors 200*a*, 200*b*, 200*c*, and 200*d* will ordinarily be adequate to hold the side members 12, 12*a*, 14, and 14*a* in positioned to form the rectangular structure 9.

The individual side members 12, 12*a*, 14, and 14*a* are preferably made from roll formed sheet steel having a thickness of from about 16 to about 20 gauge. The sheet steel is bent into the desired configuration using conventional manufacturing equipment. The opposed side members 12, 12*a* are of the same length of about 71 inches and they typically do not vary no matter what the size of the box-spring and mattress being supported. Depending on the size of the box-spring and mattress being supported, the opposed side members 14, 14*a* have a length ranging from about 26 to about 63 inches. For any type of box-spring and mattress being supported, the opposed side members 14, 14*a* are of the same length. For example, when a twin size box-spring and mattress is being supported, the length is 26 inches, when a full size box-spring and mattress is being supported, the length is 40 inches, when a king size box-spring and mattress is being supported, the length is 58⅞ inches. All the side members 12, 12a, 14, 14a are of the same width x ranging from about 5 to about 18 inches. Each individual side member 12, 12a, 14, 14a is symmetrical about its central longitudinal axis L.

Figure 2:
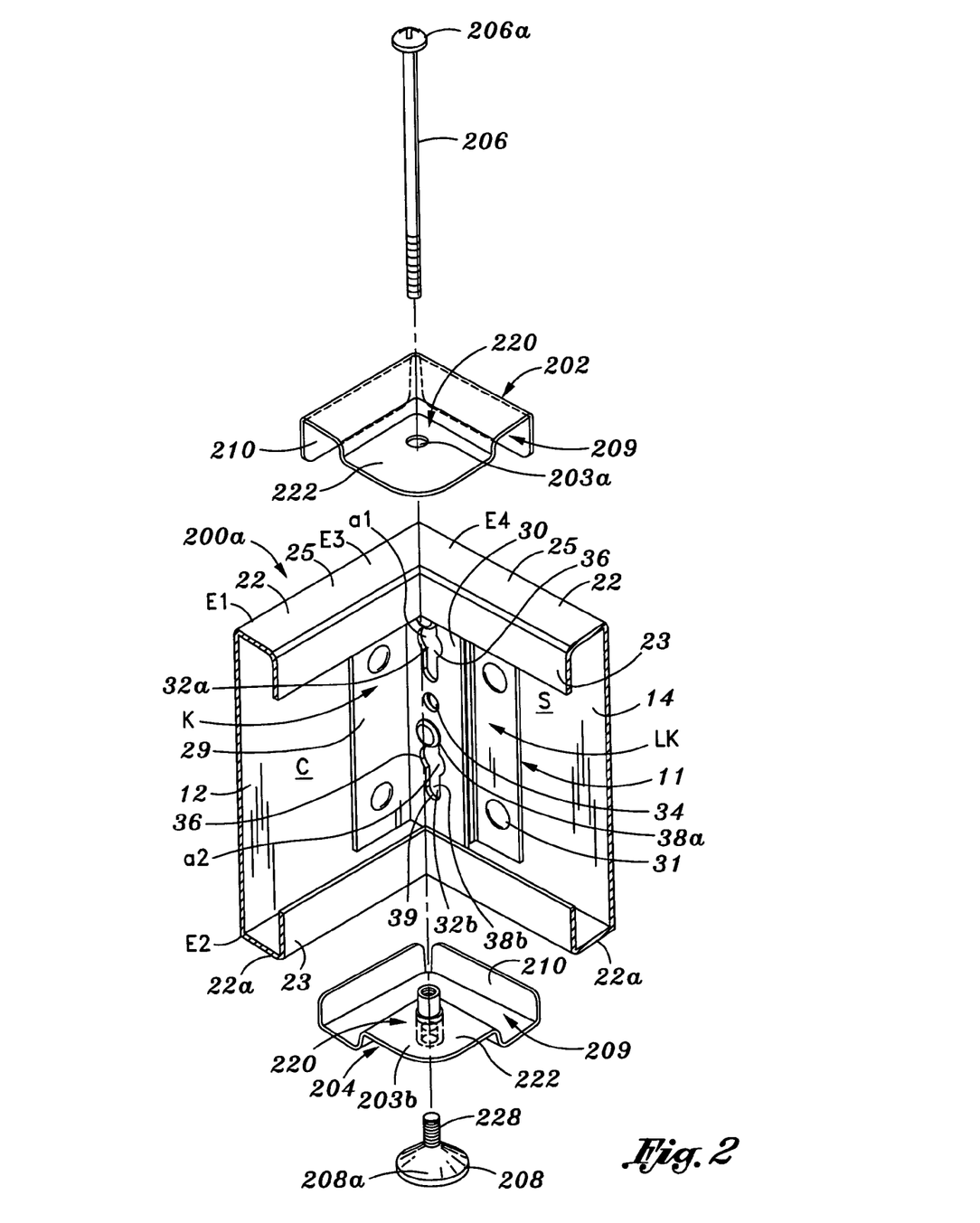
FIG. 2 is an exploded perspective view of the bed base corner connector of this invention shown in FIG. 1.
Figure 3:
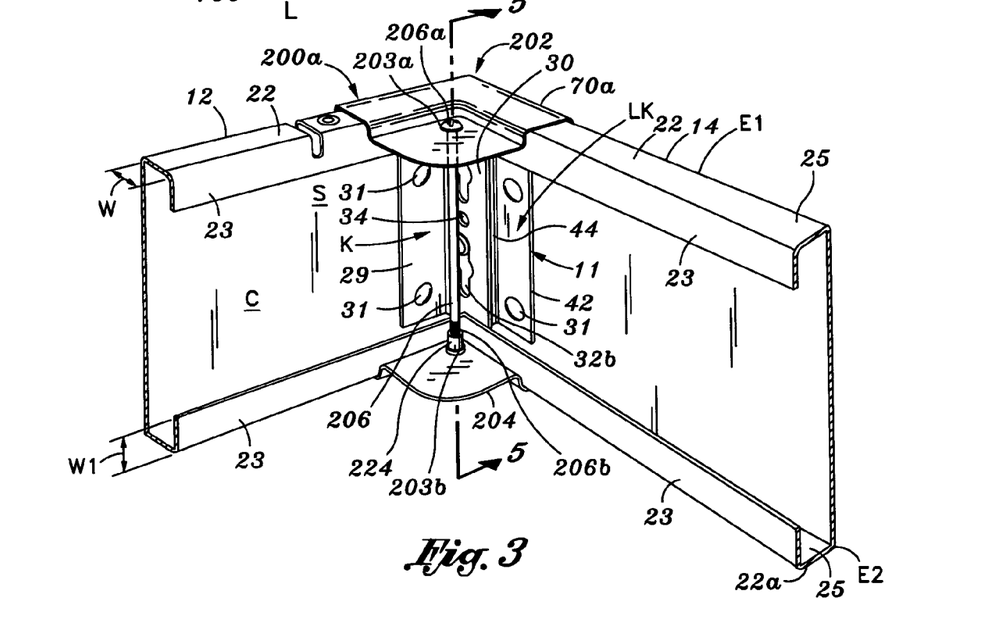
FIG. 3 is a perspective view of one corner of the bed base shown in FIG. 1 looking at the inside of this one corner, showing the corner connector assembled and holding the pair of adjacent side members forming the corner firmly in position at a right angle to each other.

As best shown on FIGS. 2 and 3, each individual side member 12, 12a, 14, and 14a has a generally C-shaped cross-sectional configuration comprising a central, longitudinally extending, planar portion C with opposed edges E1 and E2. The opposed ends E3 and E4 of each individual side member 12, 12a, 14, and 14a are chamfered or cut inward at an angle of substantially 45° to enable the adjoining, adjacent ends E3 and E4 of adjoining, adjacent side members to form a miter joint J at each corner 70a through 70d.

There extends outward in the same direction, respectively from each edge E1 and E2, an L-shaped shoulder support/stiffener 22 and 22a, respectively. The support/stiffeners 22 and 22a face each other, with their feet 23 pointing at each other and their legs 25 oriented horizontally to form longitudinal, planar support platforms. Each longitudinal support platform, or leg 25, has substantially the same width w, typically from about ¾ to about 1¼ inches. The length of each individual leg 25 is the usually same as the length of the side member from which it extends. Each leg 25 is at a right angle to the planar portion C. The individual feet 23 extend from an outer tip of the leg 25 from which it extends and each has the same width w1, typically from about ¾ to about 1¼ inches. The length of the individual feet 23 usually is the same as the length of the leg from which it extends. Typically, for any bed base w and w1 are equal, usually each being 1 inch.

In the individual side members 12, 12a there are two pairs of intermediate holes 28 (only one shown) spaced apart a distance which varies depending on the size of the box-spring and mattress being supported. Each individual pair of intermediate holes 28 is set back from its closest end E3 or E4, as the case may be, by an equal distance, typically from about 6–12 inches. The individual holes 28 in each pair of holes are in alignment with each other.

Because the side members 12, 12a, 14 and 14a are so designed as discussed above, the two halves of each individual side member partitioned along its longitudinal axis L are mirror images, making each side member symmetrical about its longitudinal axis. Each individual side member 12, 12a, 14 and 14a is also symmetrical about a central axis ZZ passing through the center of each side member and at a right angle to the individual member's longitudinal axis L. This feature of structural symmetry of the side members 12, 12a, 14 and 14a enables quick and easy assembly of the bed base of this invention, as discussed in the Patent Applications.

As best shown in FIGS. 2 and 3, the two-component connector 11 includes (a) a keyhole component K, one attached, respectively, to each of the opposed ends E3 and E4 of the members 12 and 12a, and (b) a locking component LK, one attached, respectively, to each of the opposed ends E3 and E4 of the members 14 and 14a. These components K and LK are fastened securely by rivets 31 to the planar portions C of the side members 12, 12a, 14, and 14a. The rivets 31 pass through holes in these components K and LK. These components K and LK are all attached to the inside surfaces S of the planar portions C of the side members 12, 12a, 14, and 14a, so that they all face inwardly upon assembly of these side members to form the bed base 10.

The keyhole component K has a generally L-shape configuration and in one leg 29 are the holes for the rivets 31 and in another leg 30 are two identically, symmetrically shaped oblong-type openings 32a and 32b. There is a centrally located hole 34 with its center coincident with the center of the leg 30. This hole 34 serves as a receptacle for a catch element 54 (FIG. 5) on the locking component LK. The centers a1 and a2 (FIG. 2) respectively of the openings 32a and 32b are equidistant from the longitudinal axis L of the side members to which each keyhole component K is attached. Each opening 32a and 32b has an enlarged central, circular portion 36 (FIG. 2) and a pair of narrow rectangular portions 38a and 38b (FIG. 2), each with rounded outer terminal ends 39 (FIG. 2). These narrow portions 38a and 38b extend outward in opposite directions from the central portion 36 at equal distances from the center of the circular portion 36, centers a1 or a2 as the case may be. They lie along a common line that is substantially at a right angle to the longitudinal axis L. Thus, each opening 32a and 32b is symmetrical about its respective center a1 or a2 as the case may be, and these openings 32a and 32b, being positioned equidistant from the longitudinal axis L and aligned along a common axis, make the leg 30 symmetrical.

The locking component LK has two plates 40 (FIG. 5) and 42 (FIG. 3) connected by a narrow section 44 (FIG. 3). The holes for the rivets 31 are in the plate 42 and a pair of fingers 50 and 50a (FIG. 5) extend outwardly from an inside surface of the plate 40. The locking component LK, preferably being made of a malleable material such as steel sheet, has the catch element 54 formed in this malleable material by partially punching the steel sheet. The catch element 54 extends outward from the inside surface of the plate 40. As shown in FIG. 5, each finger 50 and 50a has an enlarged head H mounted on an end of a narrow neck N. The neck N is sufficiently long to facilitate interconnecting the keyhole component K and the locking component LK by allowing the neck N to slide along the either portion 38a or 38b while the head H rides on the surface of the leg 30 of the keyhole component K. Each head H is sized to pass through the central portion 36 of the symmetrically shaped openings 32a and 32b in the keyhole component K but is larger than the narrow portions 38a and 38b. The narrow neck N is sized to be received in the one of narrow portions 38a or 38b upon assembly of the bed base 10.

The fingers 50 and 50a are aligned along a longitudinal axis of the plate 40 and the catch element 54 is along this axis between the fingers, closest to the finger 50a. The longitudinal axis of the plate 40 is substantially at a right angle to the longitudinal axis L. The catch element 54 is positioned at a predetermined location along the longitudinal axis of the plate 40 to be received in the hole 34 of the keyhole component K to attain an interlocking relationship upon connecting the two components K and LK of the two-component connector 11. Each locking component LK is attached to the central portion C of a side member 14 or 14a, as the case may be, so that the center of the catch element 54 is along the central longitudinal axis L of the side member to which it is attached. This positions the center of the head H of the finger 50 a distant of d3 from the edge E1 and the center of the head H of the finger 50a a distant of d4 from the edge E2. The distance d4 is greater than the distance d3. The distant between the centers of the heads H of the fingers 50 and 50a is equal to the distant between the centers a1 and a2 of the symmetrically shaped openings 32a and 32b in the keyhole component K.

As best shown in FIG. 1, each support bar 16 and 16a has an L-shaped arm 82 that has at each opposed ends thereof a bracket 76 mounted thereto to move laterally between an extended position and a retracted position. There is a catch element 78, similar to the catch element 54, that holds the bracket 76 in the retracted position. The details of this bracket 76 are discussed in U.S. Pat. No. 5,920,930. Inward from each opposed end of the support bars 16 and 16a is a cut-away section 92. The cut-away sections 92 on each support bar 16 and 16a are spaced apart from each other by a distance equal to the distance q between the opposed feet 23 of the side members 12 and 12a. Each cut-away section 92 has a width that is about equal to the width w of the legs 25.

Figures 7, 8:
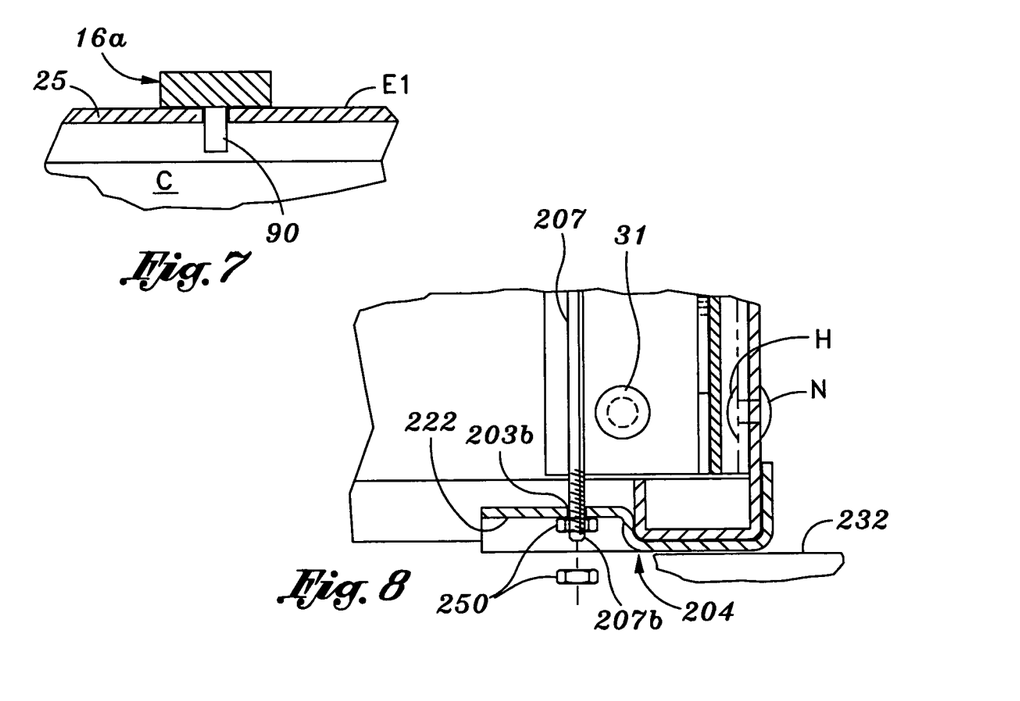
FIG. 7 is a cross-sectional view taken along line 7—7 of FIG. 1.
FIG. 8 is a cross-sectional fragmentary view depicting another embodiment of this invention.

As shown in FIG. 7, near each opposed end of each support bar 16 and 16a is a downward projecting pin 90. Each one of these pins 90 at the opposed ends of the supports bar 16 and 16a is positioned between the bracket 76 at an adjacent opposed end and the adjacent cut-away section 92. As illustrated in FIG. 1, when the support bars 16 and 16a are placed at right angles to the side members 12 and 12a on top of the opposed edges E1, the cut-away sections 92 in each support bar 16 and 16a fit snugly over these opposed edges. As depicted in FIG. 8, the pins 90 on each support bar 16 and 16a are aligned to pass through the intermediate holes 28 in the legs 25 of the opposed side member 12 and 12a, in this case the opposed aligned holes 28.

Corner Connector

The bed base 10 has respectively at each of its corners 70a through 70d, identical corner connectors 200a, 200b, 200c, and 200d. The corner connector 200a shown in FIGS. 2 through 5 is illustrative of all these corner connectors.

Figure 4:
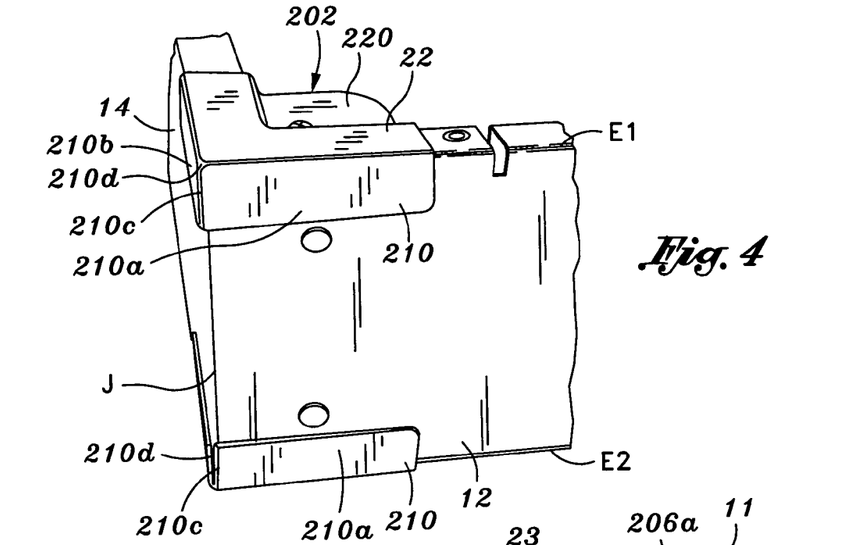
FIG. 4 is a perspective view of the one corner of the bed base shown in FIG. 3 looking at the outside of this one corner, showing the corner connector assembled and holding the pair of adjacent side members forming the corner firmly in position at a right angle to each other.

The illustrative corner connector 200a includes a top plate 202, a bottom plate 204, an elongated post 206, and an optional foot member 208. The top plate 202 and the bottom plate 204 have substantially identical configurations, for example, rectangular or square. The top plate 202 and the bottom plate 204 each have therein a right angle channel 209 and each include an outer right angle wall 210. This right angle wall 210 is normal to an adjoining wall 220 along an outer portion of the perimeter of this adjoining wall 220. The adjoining wall 220 has therein a substantially planar ledge 222 offset inwardly and spaced inwardly from the outer right angle wall 210. As best shown in FIG. 4, the outer right angle wall 210 is divided into two sections 210a and 210b with adjacent ends 210c and 210d spaced apart. The section 210a extends along an exterior surface of the side member 12. The section 210b extends along an exterior surface of the side member 14. The adjoining wall 220, the ledge 222, and the outer right angle wall 210 form the right angle channels 209 in the plates 202 and 204. The channels 209 have widths about equal to the width of the planar support members 25.

The top plate 202 and bottom plate 204 have in their ledges 222, respectively, the holes 203a and 203b. These holes 203a and 203b are aligned when the plates 202 and 204 are mounted on the side members 12 and 14 as depicted in FIGS. 2 and 3. The post 206 couples together the top plate 202 and the bottom plate 204. It extends between these plates 202 and 204 and is positioned within the rectangular support structure 9 next to a corner 70a, 70b, 70c, and 70d, as the case may be. As illustrated in FIG. 3, the post 206 has an enlarged head end 206a of greater diameter than the hole 203a. Upon assembly, enlarged head end 206a bears against an exterior surface of the ledge 222 of the top plate 202 upon passing through the hole 203a. A lower end 206b of the post 206 is threaded. This lower end 206b is adapted to be screwed into a cylindrical tubular coupling 224 seated in the hole 203b. The coupling 224 has an internal threaded passageway (not shown) and an annular flange 226 (FIG. 5) projecting outward from a side of the coupling 224. The flange 226 acts as a stop so that one portion P1 of the coupling 224 is on one side of the ledge 222 of the lower plate 204 and another portion P2 of the coupling is on another side of this lower plate ledge 222 upon inserting the coupling into the hole 203b in the lower plate. Upon assembly of the bed base 10, the threaded lower end 206b of the post 206 is screwed into the portion P1 of the coupling 224.

As shown in FIGS. 2 and 5, the foot member 208 has a body 208a of substantially truncated conical configuration with a screw member 228 projecting from its apex end and a flat smooth surface 230 at its base end. Upon assembly of the bed base 10, the flat smooth surface 230 rests upon a supporting surface 232. The post 206, the coupling 224, and the foot member 208, upon being connected, are in combination of sufficient length so that the foot members 208 at each corner 70a through 70d are at least partially below the lower edges E2 of the side members 12, 14 and 12a and 14a to elevate the bed base 10 above the supporting surface 232. The flat smooth surface 230 facilitates sliding the bed base 10 over the supporting surface 232.

During assembly of the bed base 10, the plates 202 and 204 are respectively mounted on the upper edge E1 and lower edge E2 of adjacent side members, for example, side members 12 and 14 forming the individual corner 70a of the rectangular support structure 9. The right angle channels 209 of the top plate 202 and bottom plate 204 respectively receive therein the upper edge E1 and lower edge E2, including the support members 25. The top plate 202 overlaps the upper edge E1 of the adjacent side members 12 and 14 and the bottom plate 204 overlaps the lower edge E2 of these adjacent side members. As the threaded end 206b of the post 206 is screwed into the foot member 208, the top plate 202 and bottom plate 204 are coupled together and drawn towards each other so these plates each bear snugly against the edges including the support members 25 of the adjacent side members forming the individual corner 70a. The support members 25 having widths equal to the width of the channels 209 onsequently fit snug with these channels.

Another embodiment of this invention depicted in FIG. 8 does not use a foot member 208. In this embodiment a hex nut 250 may be used instead of the foot member 208. In this embodiment, the hex nut 250 simply secures a post 207 to the lower plate 204. The bottom plates 204 rest on the supporting surface 232. The post 207 is essentially the same as the post 206 except it is sufficiently long to pass through the hole 203b in the bottom plate 204. The length of the post 206 is sufficient so that its threaded lower end 207b extends through the hole 203b and is screwed into the hex nut 250. As shown in phantom lines, upon assembly, the hex nut 250 bears against an underside surface of the ledge 222 in the bottom plate 204. The post 207 has a head (not shown) bearing against the ledge 222 in the top plate 202.

Another embodiment of this invention depicted in FIGS. 9 and 10 does not use the two-component connector 11, or a similar connector. In this embodiment, the bed base 10 has respectively at each of its corners 70a through 70d, only the identical corner connectors 200a, 200b, 200c, and 200d, respectively. The four side members 12, 12a, 14, and 14a do not have any connector other than the identical corner connectors 200a, 200b, 200c, and 200d at their respective ends holding the corners 70a through 70d firmly together.

Because of the symmetry of the four side members 12, 12a, 14, and 14a, no special orientation of these side members and the connectors 200a, 200b, 200c, and 200d is required.

Bed Base Kit

As illustrated in FIG. 6, the bed base kit 300 includes a package 104 containing all the pieces to assemble the bed base 10: namely, the four side members 12, 12a, 14, and 14a, four corner connectors 200a, 200b, 200c, and 200d, and the two box-spring/mattress support bars 16 and 16a. Each of the corner connectors 200a, 200b, 200c, and 200d includes the top plate 202, the bottom plate 204, and the post 206 or 207 and foot member 208 or hex nut 250, depending on which of the two embodiments is being employed. The package may be substantially smaller than that depicted, requiring the individual pieces to be stacked on top of each other. A smaller package would be more convenient to ship. When a twin size bed base is provided, fewer pieces are needed than the kit 300 depicted in FIG. 6. In the case of a twin size bed base, a kit includes four side members, only one pair of corner brace plates, and only one box-spring/mattress support bar. The dimensions of the side members and the box-spring/mattress support bar would be appropriate for supporting the twin size box-spring. The corner brace plates would be attached to diagonal corners. The side members 12, 12a, 14, and 14a may or may not be equipped with the two component connectors 11.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A bed base including
a plurality of side members being oriented to stand upright and being connected together at opposed ends to form a support structure, each side member including at least one pair of parallel edges, said bed base having corners formed by adjacent side members being connected to each other by a corner connector comprising
a pair of plates, each plate overlapping the parallel edges of the adjacent side members forming an individual corner, and
a post element extending between the plates and pulling the plates towards each other to press said plates firmly against the edges of the adjacent side members forming the corner to which the corner connector is attached where the post element has a lower end, and a foot member is attached to the lower end of the post element.

2. A bed base including
four side members oriented to stand upright and connected together at opposed ends to form a substantially rectangular support structure, each side member including a pair of parallel edges,
a connector at a corner of the support structure formed at adjacent side members, said connector comprising
a pair of plates overlapping the parallel edges of adjacent side members forming said corner, and
a post element extending between the plates and pulling the plates towards each other to press said plates firmly against the edges of the adjacent side members forming the corner,
said plates each having therein a right angle channel, said plates being mounted on the parallel edges of the adjacent side members forming said corner, said right angle channel of one plate receiving one edge from each of the pair of edges in each adjacent side member and said right angle channel of the other plate receiving one edge from each of the other pair of edges in each adjacent side member.

3. The bed base according to claim 2 where the plates each have an outer right angle wall having a first section extending along an exterior surface of one of the adjacent side members forming said individual corner and a second section extending along an exterior surface of the other of the adjacent side members forming said individual corner.

4. The bed base according to claim 3 where each plate has therein a substantially planar ledge offset inwardly and spaced inwardly from the outer right angle wall, said ledge and wall forming said channel of each plate.

5. A bed base including
four side members each having opposed edges,
said side members oriented to stand upright on one edge to form a substantially rectangular support structure with a corner of the support structure formed at adjacent side members that are substantially at a right angle with respect to each other, and
a connector comprising
a plate overlapping the edges of the adjacent side members forming said corner, and
said plate having therein a right angle channel, and said plate being mounted on the edges of the adjacent side members forming said corner,
said right angle channel receiving one edge from each of the adjacent side members.

* * * * *